(12) United States Patent
Berger et al.

(10) Patent No.: US 8,540,309 B2
(45) Date of Patent: *Sep. 24, 2013

(54) APPARATUS FOR RECEIVING AN INFORMATION MEDIUM

(75) Inventors: Georg Berger, Bottrop (DE); Thomas Bulirsch, Lichtenfels-Schney (DE)

(73) Assignee: Inviseo Media Holdings Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/423,897

(22) Filed: Mar. 19, 2012

(65) Prior Publication Data

US 2012/0212012 A1    Aug. 23, 2012

Related U.S. Application Data

(63) Continuation of application No. PCT/EP2010/062263, filed on Aug. 23, 2010.

(30) Foreign Application Priority Data

Sep. 21, 2009 (RU) ................................ 2009135159

(51) Int. Cl.
| | |
|---|---|
| *A47B 83/02* | (2006.01) |
| *A47B 37/00* | (2006.01) |
| *A47B 13/16* | (2006.01) |
| *A47B 3/14* | (2006.01) |
| *A47B 5/04* | (2006.01) |
| *A47C 7/62* | (2006.01) |
| *G09F 7/12* | (2006.01) |
| *G09F 3/18* | (2006.01) |

(52) U.S. Cl.
USPC .......... 297/163; 297/188.04; 108/25; 108/42; 108/44; 108/90; 108/134; 108/152; 40/320; 40/593; 40/594; 40/661

(58) Field of Classification Search
USPC ................ 297/146, 163, 188.04; 108/25, 42, 108/44, 90, 134, 152; 40/320, 593, 594, 40/661
See application file for complete search history.

(56) References Cited

U.S. PATENT DOCUMENTS

| | | | |
|---|---|---|---|
| 2,131,586 | A | 9/1938 | Dano |
| 2,517,433 | A | 8/1950 | Hoven et al. |

(Continued)

FOREIGN PATENT DOCUMENTS

| | | |
|---|---|---|
| BE | 1011608 A7 | 11/1999 |
| DE | 4305695 A1 | 9/1994 |

(Continued)

*Primary Examiner* — Rodney B White
(74) *Attorney, Agent, or Firm* — Reinhart Boerner Van Deuren P.C.

(57) ABSTRACT

The present invention relates to an apparatus, in particular for attaching to the back of a seat. The apparatus comprises a plate with a flat recess and an insert which is removably mountable in the flat recess of the plate and is configured to receive an information medium which is viewable when the insert is mounted in the flat recess of the plate. For releasably fixing of the insert on mounting of the same in the flat recess, the insert has the following: at least one tongue on a first border area of the insert for engagement in at least one correspondingly shaped groove in the plate, and at least one releasable fixing that is present in or on at least one second border area of the insert and that is operable by twisting and/or sliding at least one component.

20 Claims, 4 Drawing Sheets

(56) References Cited

U.S. PATENT DOCUMENTS

| | | |
|---|---|---|
| 2,619,395 A | 11/1952 | Kent |
| 3,795,422 A | 3/1974 | Robinson et al. |
| 4,511,178 A | 4/1985 | Brennan |
| 5,241,767 A | 9/1993 | Fuda et al. |
| 5,720,515 A | 2/1998 | Haffner |
| 6,592,179 B1 | 7/2003 | Miyazaki |
| 6,758,518 B2 | 7/2004 | Ingram et al. |
| 7,104,599 B2 | 9/2006 | Berger et al. |
| 7,611,198 B2 | 11/2009 | Schweizer |
| 7,621,593 B2 | 11/2009 | Dickinson |
| 8,091,959 B2 * | 1/2012 | Berger et al. ............ 297/163 |
| 2002/0029504 A1 | 3/2002 | Lowndes |
| 2003/0217673 A1 | 11/2003 | Berger et al. |
| 2004/0124675 A1 | 7/2004 | Ingram et al. |
| 2005/0115126 A1 | 6/2005 | Rampen et al. |
| 2005/0204596 A1 | 9/2005 | Peng |
| 2005/0206206 A1 | 9/2005 | Peng |

FOREIGN PATENT DOCUMENTS

| | | |
|---|---|---|
| DE | 20108619 U1 | 1/2002 |
| DE | 10118496 A1 | 10/2002 |
| EP | 1260433 A2 | 11/2002 |
| JP | 2002106181 A | 4/2002 |
| WO | WO 99/04381 A1 | 1/1999 |
| WO | WO 99/32016 A1 | 7/1999 |
| WO | WO 2007/122514 A2 | 11/2007 |
| WO | WO 2007/122514 A3 | 11/2007 |
| WO | WO 2008/021246 A2 | 2/2008 |
| ZA | 2002/0707 | 7/2002 |

* cited by examiner

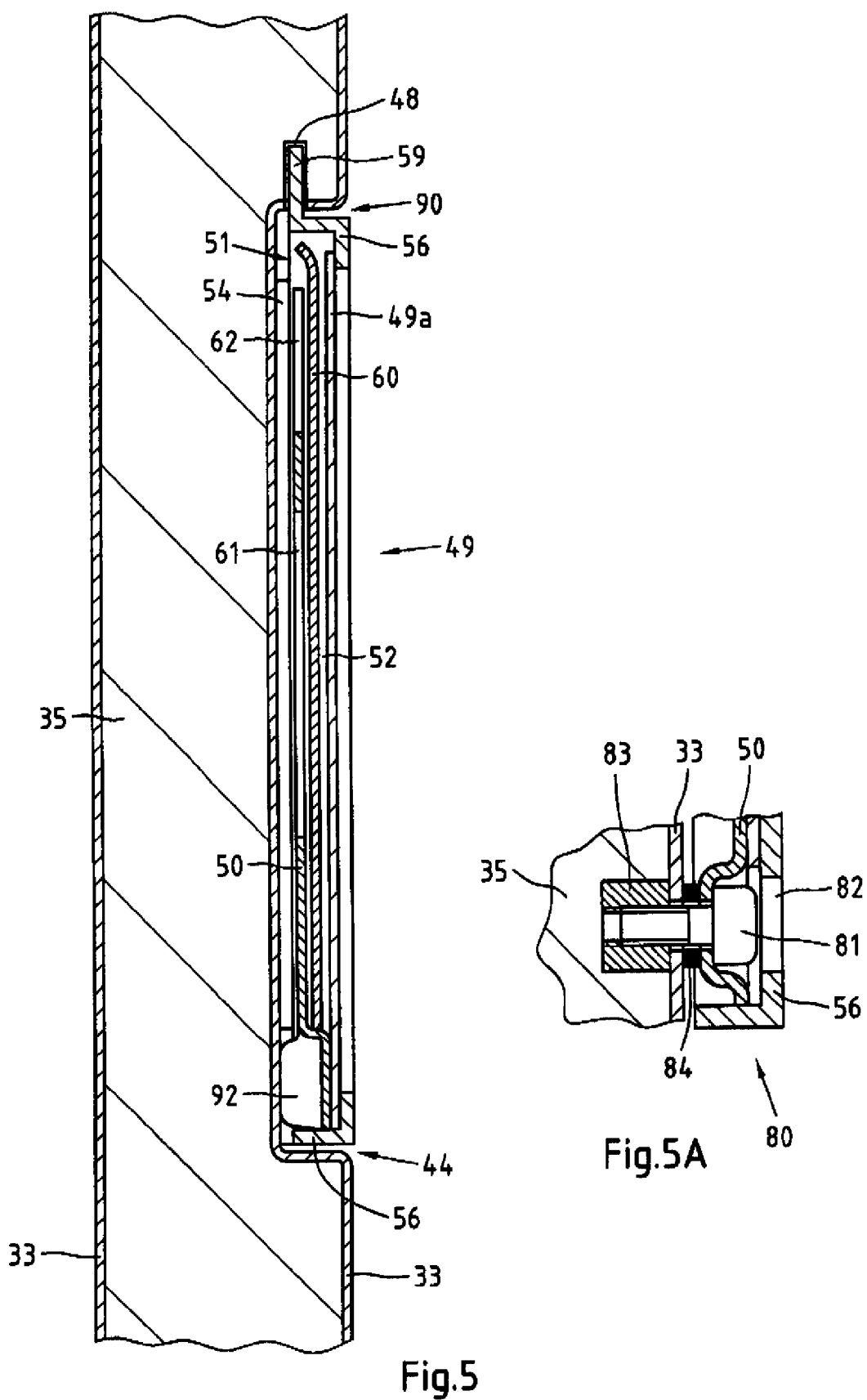

APPARATUS FOR RECEIVING AN INFORMATION MEDIUM

CROSS-REFERENCE TO RELATED PATENT APPLICATIONS

This patent application is a continuation of PCT/EP2010/062263, filed Aug. 23, 2010, which claims priority to Russian Application No. 2009135159, filed Sep. 21, 2009, the entire teachings and disclosure of which are incorporated herein by reference thereto.

FIELD OF THE INVENTION

The present invention relates to an apparatus, in particular for attaching to the back of a seat, comprising a plate with a flat recess and an insert which is removably mountable in the flat recess of the plate and is configured to receive an information medium which can be viewed when the insert is mounted in the flat recess of the plate.

BACKGROUND OF THE INVENTION

Such apparatuses are used for example as folding tables attached to the backs of seats in vehicles, in particular aircraft, road vehicles or water vehicles, to receive printed advertising brochures as information media.

Such a folding table is known for example from the German utility model DE 201 08 619 U1. There the insert consists of an elastically deformable transparent plastic which has rigid protruding tongues on at least two opposing borders, which tongues engage removably in grooves on the opposing borders of the recess. The disadvantage of this design is that the insert (in particular the tongues) can be damaged or destroyed due to the mechanical deformation necessary to insert/remove the insert from the recess, in particular on frequent insertion or removal.

SUMMARY OF SOME EXEMPLARY EMBODIMENTS OF THE INVENTION

The present invention solves the problem, amongst others, of providing a simple and robust apparatus to receive an information medium.

This problem is solved by an apparatus according to claim 1. Advantageous embodiments are shown in the dependent claims.

According to the present invention, for releasably fixing (also referred to herein as releasably attaching) of the insert in the flat recess of the plate, the insert has at least one tongue in a first border area of the insert which engages in a groove, for example on the border of the flat recess of the plate. Furthermore, the insert has, in or on at least one second border area of the insert, a releasable fixing (also referred to herein as a releasable attachment) which is operable by twisting and/or sliding at least one component. To fix the insert in the flat recess, for example first the tongue of the insert can be introduced into the groove of the recess and then the insert can be fixed by twisting and/or sliding the component of the fixing apparatus in the flat recess. A mechanical load on the tongue can be largely avoided because the tongue ideally need not be deformed at all.

In exemplary embodiments of the invention, the releasable fixing is formed as a screw which interacts with a thread provided in the plate. The screw can have in its head a specially designed recess that deviates from the conventional slots, cross slots or hexagon sockets (Allen key), for example a polygonal recess, in particular a triangular recess. This special recess can for example only be operated with a correspondingly shaped special tool. The screw can be held rotatably in the insert so that it cannot fall out of or be removed from the insert even on removal of the insert from the flat recess of the plate. This facilitates changing the information medium as there is no need to worry about whether or not the screw falls out.

In exemplary embodiments of the invention, the releasable fixing comprises a lock which interacts with the plate. The lock can for example only be operated with a key which is not available to unauthorised persons.

In exemplary embodiments of the invention, the releasable fixing has as a component at least one bolt which can be brought into engagement with the plate by twisting and/or sliding. The bolt can for example be spring-mounted so that for example it always aims to reach a locked position.

In exemplary embodiments of the invention, the twisting and/or sliding of the at least one component of the fixing apparatus can be performed only with a tool. The tool can for example be a special tool which is not available to unauthorised persons.

In exemplary embodiments of the invention, the first border area and the second border area lie opposite each other. In this arrangement, adequate mechanical stability of the insert when held in the recess can be achieved with few components, for example if only one tongue and only one opposing fixing apparatus is used.

In exemplary embodiments of the invention, the insert has two pairs of opposing parallel edges, wherein the first border area lies on one of these edges and the second border area lies on the opposite edge of this edge. The second border area can then have two releasable fixings which are provided on opposing ends of the second border area. This prevents the insert from being able to be prised open at the ends of the second border area. It is particularly advantageous if in the first border area tongues are likewise provided at least on opposing ends or a tongue running substantially over the entire edge of the first border area is provided.

In exemplary embodiments of the invention, on mounting in the flat recess of the plate, the insert terminates flush with the plate at least at its border. This reduces the risk of injury from protruding parts.

In exemplary embodiments of the invention, the insert has a pocket for receiving the information medium, wherein the pocket has an opening for insertion and/or removal of the information medium, wherein the opening faces the first border area and wherein the at least one tongue is formed on the first border area such that in at least one position of the apparatus, it can screen the opening from penetrating objects and/or liquids.

The insert can for example be formed as a rectangular frame, on the upper edge of which the at least one tongue is formed set back in relation to the front of the frame, wherein the pocket is formed on the back of the frame and as an opening has an elongated opening which is oriented towards the upper edge of the frame and is shorter than the at least one tongue.

If the apparatus is formed as a folding table attached to the back of a seat, the at least one position in which the at least one tongue can screen the opening from penetrating objects and/or liquids can be a rest position of the folding table, in which the folding table is folded against the back of the seat. The folding table is usually cleaned in this position and is then fundamentally exposed most strongly to the penetration of cleaning fluids.

In exemplary embodiments of the invention, the apparatus is formed as a folding table attached to the back of a seat, in particular a seat in a vehicle.

In exemplary embodiments of the invention, impact-absorbing material is installed in the flat recess of the plate at least in one border area, which material comes into contact with the insert on mounting of the insert in the flat recess of the plate. This can prevent or reduce injuries to persons who come into contact with the plate. The material can also function as a seal. The material can also suppress disruptive vibrations on operation of the vehicle in which the apparatus is located.

The impact-absorbing material can for example not be provided in the border area on which the at least one groove is formed, for example in order not to unnecessarily hinder or obstruct the insertion of the tongue into the groove.

In exemplary embodiments of the invention, the insert comprises a frame and a back wall which forms a pocket to receive the information medium.

The insert can furthermore comprise a transparent sheet or film through which the information medium in the pocket is viewable on mounting of the insert in the flat recess of the plate.

The transparent sheet or film can for example at least partly be made of splinter-resistant material to prevent or reduce injury in the event of accidents.

In exemplary embodiments of the invention, the apparatus is at least partly made of flame-retardant plastic.

In exemplary embodiments of the invention, the information medium is a printed sheet.

In exemplary embodiments of the invention, the information medium is configured to display information, in particular advertising, and the information displayed is changeable by control, for example electronic control, of the information medium.

The problem of the invention is furthermore solved by a seat comprising an apparatus according to the invention as described in the paragraphs above.

The problem of the invention is furthermore solved by a vehicle comprising a seat as described in the paragraph above.

The above-disclosed features of the exemplary embodiments of the present invention are also to be understood as disclosed in all combinations with one another.

The embodiments described above are to be understood merely as examples and do not restrict the present invention in any way.

BRIEF DESCRIPTION OF THE FIGURES

In the figures:

FIG. 5 shows a sectional view in the plane V-V of the insert of FIGS. 2 and 3 when the insert is mounted in the apparatus according to the invention according to FIG. 1;

FIG. 5A shows a sectional view in the plane VA-VA of the insert from FIGS. 2 and 3 which shows details of a fixing apparatus according to the invention.

DETAILED DESCRIPTION OF SOME EXEMPLARY EMBODIMENTS OF THE PRESENT INVENTION

The present invention is described below with reference to exemplary embodiments, in particular in the form of a back rest folding table for a seat in a vehicle. The present invention is not, however, restricted to such applications.

Figure 1:
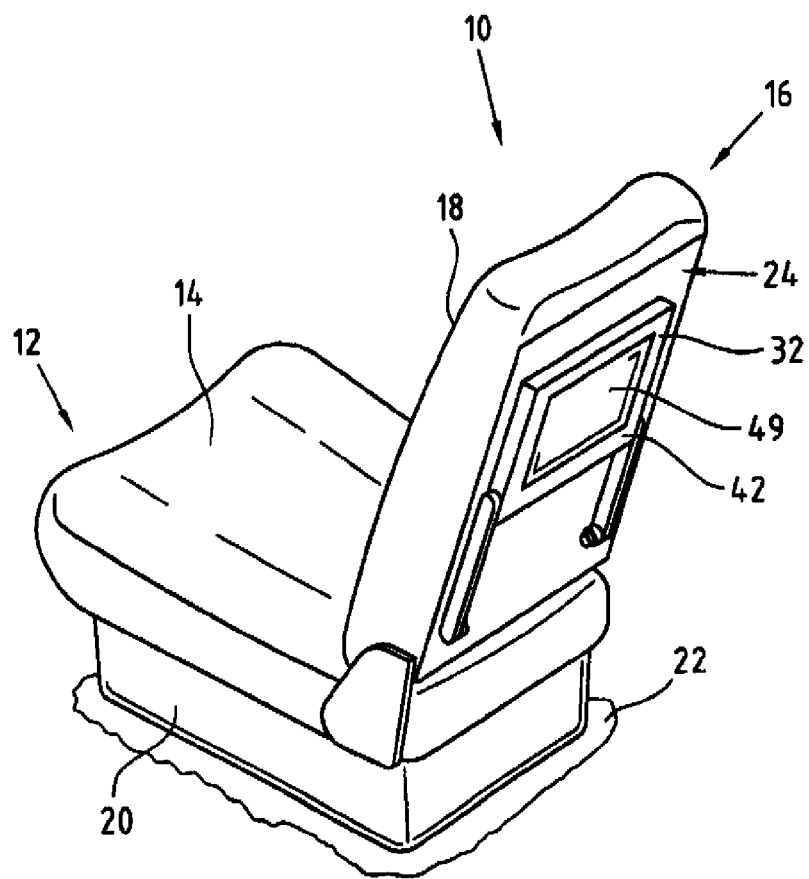
FIG. 1 shows a perspective view of a seat with an apparatus according to the invention attached to the back thereof.

FIG. 1 shows a perspective view of a seat 10 which for example can be mounted in a vehicle e.g. an aircraft, ship, bus or car.

The seat rests on a base 20 which is connected to the floor 22 and has a seat cushion 12 with a seating surface 14 and a back rest 16 with support surface 18. On the rear of the back rest 16 a back cover 24 is attached, on which in turn a folding table 32 is attached as an exemplary embodiment of the present invention. The folding table 32 is shown in FIG. 1 in its upright rest position, in which its back 42 is visible; however, it can also be lowered into a second, essentially horizontal, usage position, in which it encloses an angle of around 70°-80° with the back cover 24. In this usage position the table can for example carry food and drinks or serve as a desk pad.

The folding table 32 has a flat recess in its back 42 in which the insert 49 is removably mountable. FIG. 1 shows the insert 49 in its state mounted in the recess of the folding table 32. The insert in turn carries an information carrier, for example a printed sheet with advertising, which can be viewed in the rest position of the folding table 32 by a person seated behind the seat 10, for example a person sitting on the seat behind the seat 10.

Figure 2:
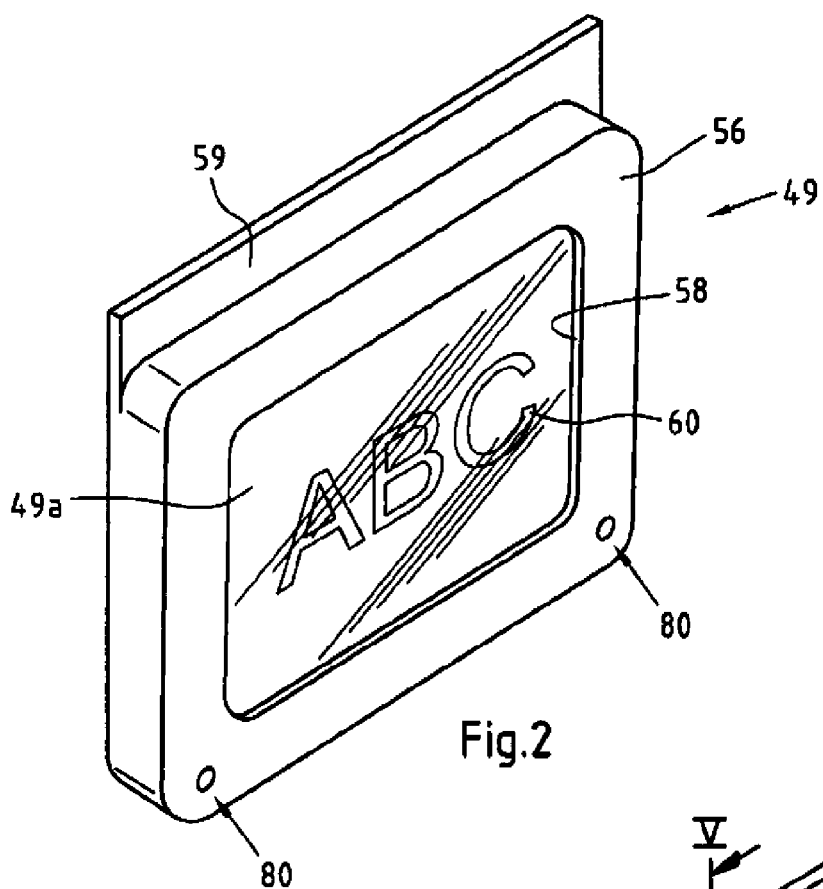
FIG. 2 shows a perspective view of the front of an insert of the apparatus according to the invention.
Figure 3:
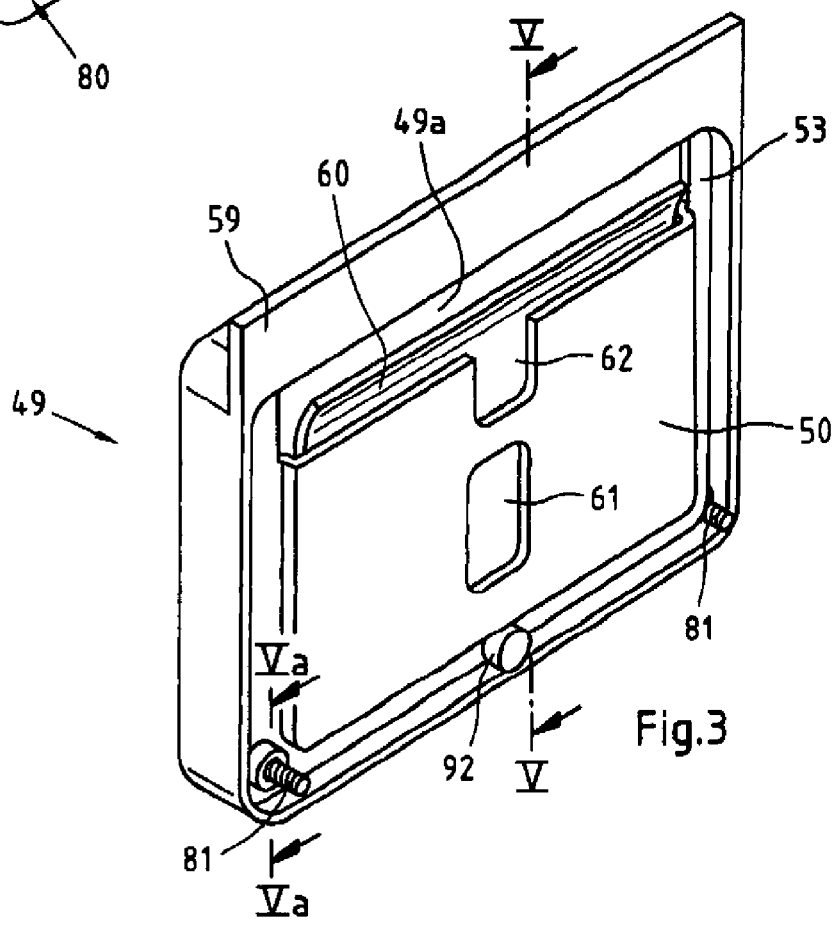
FIG. 3 shows a perspective view of the rear of an insert of the apparatus according to the invention.

FIG. 2 shows a perspective view of the front of the insert 49 of the folding table 32 according to FIG. 1. FIG. 3 shows the back of the insert 49 accordingly.

The insert 49 comprises a frame 56 with an opening 58, a transparent sheet 49a, an information medium (for example a printed sheet with advertising or other contents), and a back wall 50. The back wall 50 is fastened to the frame from behind, for example by gluing. The plate 49a is thus held between the back of the frame 56 and the back wall 50. This back wall 50 is shaped such that a pocket 52 is formed (see FIG. 5) to receive the information medium 60, such that an elongated opening 51 only opens at the top (see FIG. 5) through which the information medium 60 can be introduced into and removed again from the pocket 52 (see FIG. 5). This back wall furthermore has an opening 61 and a recess 62 which serve to facilitate the insertion/removal of the information medium 60 into the pocket 52 or out of the pocket 52. This gives a particularly simple and economic structure of the insert 49.

At the upper edge of the frame 56, a tongue 59 is arranged over the entire edge length. The tongue 59 can for example be formed as one piece (monolit hic) with the frame 56. The tongue 59 is recessed in relation to the front of the frame 56; it can for example terminate flush with the back of the frame 56 as shown in FIGS. 2 and 3.

In the lower border area of the frame 56 two fixing apparatuses 80 are furthermore inserted into the frame 56 which in the present case are formed as an example as screws 81. Between the two fixing apparatuses 80 a spacer element 92 is provided, which supports the insert 49 against the flat recess and thus additionally stabilises it. This spacer element can, however, also be omitted or replaced by an additional fixing apparatus 80.

Figure 4:
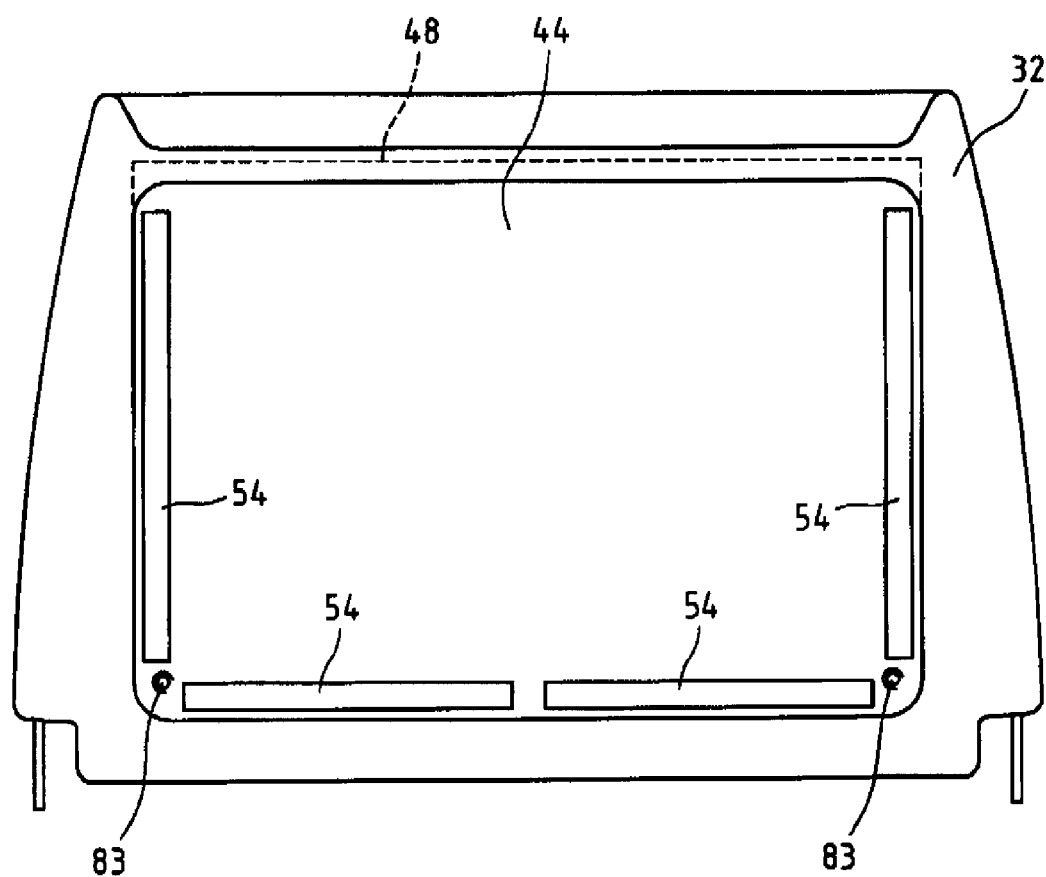
FIG. 4 shows a top view onto the underside of the apparatus according to the invention with the insert removed.

FIG. 4 shows a top view onto the underside (see FIG. 1) of the folding table 32 without the insert 49. The folding table 32 has a flat recess 44 to receive the insert 49. At the border of the flat recess, impact-absorbing material 54 is mounted on three sides, for example to prevent or reduce disruptive vibrations of the insert 49 when received in the flat recess 44 of the folding table 32. On the border of the flat recess 44, a groove 48 is provided in the folding table 32, shown in dotted lines in FIG. 4, which extends over the entire length of the flat recess 44 and can hold the tongue 59 of the insert 49. In the lower area of the flat recess 44, two threads 83 are provided on the left and right on the outside, in each of which one of the screws 81 of the fixing apparatus 80 of the insert 49 can be screwed in order to fix the insert 49 in the flat recess 44.

FIG. 5 is a sectional view in the plane V-V of the insert from FIGS. 2 and 3 when the insert 49 is mounted in the flat recess 44 of the folding table 32 according to FIG. 1.

What is clearly visible in the cross section is the folding table 32 which has a wall 33 and a filling 35 (for example of foam plastic). In the folding table 32 the flat recess 44 which holds the insert 49 is formed. To fix the insert 49 in the flat recess, the tongue 59 of the insert 49 has been introduced into the groove 48 of the folding table 32 and the screws 81 of the fixing apparatuses 80 are screwed into the threads 83 in the flat recesses (see FIG. 5A, which shows part of the sectional view VA-VA of the insert from FIGS. 2 and 3, in which the fixing apparatus 80 is shown more clearly). The back wall 50 of the insert 49 is then pressed at least partly against the impact-absorbing material 54.

To remove the insert 49 from the flat recess 44 (e.g. for the purpose of changing the information medium 60), the screws 81 are unscrewed, the insert 49 is moved away from the flat recess 44 in the lower area in which the screws 81 are attached and then the tongue 59 is withdrawn downwards out of the groove 48.

FIG. 5 shows that on receipt of the insert 49 in the flat recess 44 of the folding table 32, at least the border (or frame 56) of the insert 49 terminates flush with the table surface of the folding table.

FIG. 5 in combination with FIG. 2 also shows that the tongue 59 is arranged on the frame 56 of the insert 49 such that the penetration of fluids (or objects such as crumbs or other dirt) into the pocket 52, and hence contamination or destruction of the information medium 60 contained in the pocket 52, can be prevented. This applies in particular in the position of the folding table 32 shown in FIG. 5 which corresponds to the upright rest position. If, for example, the folding table 32 is cleaned with a wet cloth while in this position, liquids can indeed enter the cavity, labelled 90, between the upper edge of the insert 49 and the upper edge of the flat recess 44 but from there cannot reach the area of the opening 51 of the pocket 52 as this is effectively screened by the tongue 59. As is evident from FIG. 2, the liquid can then run down either over the front of the insert 49 or on the left or right sides of the frame 56 over its rounded corners, as the tongue 59 extends over the entire edge length including the length taken by the rounded corners and only terminates with the left and right side walls of the frame. Penetration of the liquid into pocket 52 is not possible, however. If the folding table 32 is brought into its lowered usage position (i.e. rotated through 90° clockwise in FIG. 5), the effect of gravity is added to the protection achieved by the arrangement of the tongue so that liquids are diverted away from insert 49 and its pocket 52.

FIG. 5A shows in more detail one of the two fixing apparatuses 80 (as a sectional view in the plane VA-VA of FIG. 3) which are arranged in the lower area of the frame 56 of the insert 49 at opposing ends and for example are formed as screws 81. To protect against unauthorised operation of the screws 81, the heads of the screws contain a recess which can only be operated with a correspondingly shaped special tool, for example a polygon fitting precisely into the recess, in particular a triangle, from the outside through the opening 82 (instead of the conventional slots, cross slots or Allen key openings otherwise used in screws). Naturally, deviating designs of the screw head are also possible. The screws are held rotatably in the insert 49 as shown in FIG. 5A so that they cannot fall out on removal of the insert 49 from the flat recess 44 of the folding table 32. By rotation, the screws can be brought into engagement with the respective thread 83 in the flat recess 44. Between the insert 49 and the flat recess, rings 84 can also be arranged pushed onto the screws 81 to achieve additional damping and/or reduce rattles/vibrations.

Due to the interaction of the tongue 59 with the groove 48 on the one hand and the interaction of the fixing apparatus 80 with the folding table 32 on the other hand, a robust and secure fixing of the insert 49 in the flat recess 44 of the folding table 32 is achieved, which fixing can easily be released again—although only by authorised personnel—in order for example to allow a change of the information medium. Thus no or only insignificant mechanical loads occur on the insert 49 (and particular not on the tongue 59). Also the special design and arrangement of the tongue 59 allows screening of the pocket 52 from penetrating foreign bodies.

The present invention is not restricted to the design of the exemplary embodiments described above as examples.

In alternative embodiments, the fixing apparatus 80, instead of twisting, can also be operated by sliding or a combination of twisting and sliding of an element. For example, the fixing apparatus 80 can have a bolt which, to fix the insert 49 in the flat recess 44, can be slid (e.g. displaced linearly) or swivelled into a groove formed in the folding table 32. This groove can for example lie in the lower side wall 46 of the flat recess 44 which is opposite the upper side wall containing the groove 48. The bolt can for example be pretensioned by use of a spring such that it aims to reach the fixing/locking position, whereby unauthorised operation of the bolt to release the fixing is rendered more difficult.

In a further alternative embodiment, the fixing apparatus 80 can also be formed as a lock which can be operated only with a key and causes a locking of the insert against the folding table 32.

In a further alternative embodiment, tongues are provided not only on the upper edge of the frame 56 but also on its side edges. The folding table 32 has corresponding grooves in which these tongues can engage. This embodiment furthermore hinders unauthorised removal of the insert 49 from the flat recess 44 or its destruction (for example by levering out).

In a further alternative embodiment, there are not two fixing apparatuses but merely one fixing apparatus, for example arranged centrally in the lower border area of the frame 56. This can facilitate the fixing of the insert 49 in the flat recess 44 of the folding table 32 or removal of the insert 49 from the flat recess 44 of the folding table 32; however, it can make it easier to destroy the insert 49 by unauthorised levering in the lower corners of the frame 56. This undesirable effect can be countered for example by the arrangement of further tongues in these corners.

In a further alternative embodiment, more than two fixing apparatuses can be provided, and/or fixing apparatuses on the further border areas (e.g. also on the left and/or right border of the frame 56 and/or also in the upper border area on which the tongue 59 is arranged).

In a further alternative embodiment, the tongue 59 (or further tongues where applicable) is not angled away from the frame 56 as shown in FIG. 5 but an extension of the frame so that it does not engage in a groove arranged parallel to the surface of the flat recess (as the groove 48 in FIG. 5) but in a groove arranged perpendicular to the surface of the flat recess. This can facilitate insertion/removal of the insert 49 but also allows unauthorised removal or destruction of the insert 49. This can in turn be countered by a corresponding design of the tongue and/or groove so that, for example when the tongue is engaged in the groove, there is a form-fit or force-fit connection.

The invention claimed is:

1. Apparatus, in particular for attaching to the back of a seat, said apparatus comprising:
   a plate with a flat recess;
   an insert which is removably mountable in said flat recess of said plate and is configured to receive an information medium which is viewable when said insert is mounted in said flat recess of said plate,
   wherein for releasably attaching of said insert on mounting of the same in said flat recess, said insert has the following:
      at least one tongue on a first border area of said insert for engagement in at least one correspondingly shaped groove in said plate, and
      at least one releasable attachment that is present in or on at least one second border area of said insert and that is operable by at least one of twisting and sliding at least one component.

2. Apparatus according to claim 1, wherein said releasable attachment comprises as rotatable component a screw which interacts with a thread provided in said plate.

3. Apparatus according to claim 2, wherein said screw is held rotatably in said insert so that it cannot fall out of or be removed from said insert even on removal of said insert from said flat recess of said plate.

4. Apparatus according to claim 1, wherein said releasable attachment comprises a lock which interacts with said plate.

5. Apparatus according to claim 1, wherein said releasable attachment has as component at least one bolt which can be brought into engagement with said plate by at least one of twisting and sliding.

6. Apparatus according to claim 1, wherein said at least one of twisting and sliding of said at least one component of said releasable attachment is only performable with a tool.

7. Apparatus according to claim 6, wherein said tool is a special tool which is not available to unauthorised persons.

8. Apparatus according to claim 1, wherein said insert has two opposing parallel edges, wherein said first border area lies on a first one of the two opposing parallel edges and said second border area lies on a second one of the two opposing parallel edges.

9. Apparatus according to claim 8, wherein said second border area has two releasable attachments which are provided on opposing ends of said second border area.

10. Apparatus according to claim 1, wherein on mounting in said flat recess of said plate, said insert terminates flush with said plate at least at its border.

11. Apparatus according to claim 1, wherein said insert has a pocket for receiving said information medium, wherein said pocket has an opening for at least one of insertion and removal of said information medium, wherein said opening faces said first border area and wherein said at least one tongue is formed on said first border area such that in at least one position of said apparatus, it can protect said opening from at least one of penetrating objects and liquids.

12. Apparatus according to claim 11, wherein said insert is formed as a rectangular frame, on an upper edge of which said at least one tongue is formed such that it is spaced from a front of said rectangular frame, wherein said pocket is formed on a back of said rectangular frame and has an elongated opening which is oriented towards said upper edge of said rectangular frame and is shorter than said at least one tongue.

13. Apparatus according to claim 11, wherein said apparatus is formed as a folding table attached to the back of a seat, and wherein said at least one position in which said at least one tongue can protect said opening from at least one of penetrating objects and liquids is a rest position of said folding table, in which said folding table is folded against the back of said seat.

14. Apparatus according to claim 1, wherein impact-absorbing material is installed in said flat recess of said plate at least in one border area, which material comes into contact with said insert on mounting of said insert in said flat recess of said plate.

15. Apparatus according to claim 1, wherein said insert furthermore comprises:
   a frame and
   a back wall which forms a pocket to receive said information medium, and
   a transparent sheet or film through which said information medium in said pocket is viewable on mounting of said insert in said flat recess of said plate.

16. Apparatus according to claim 15, wherein said transparent sheet or film is at least partly made of splinter-resistant material.

17. Apparatus according to claim 1, wherein said apparatus is at least partly made of flame-retardant plastic.

18. Apparatus according to claim 1, wherein said information medium is at least one of a printed sheet and an information medium configured to display information, in particular advertising, and said information displayed is changeable by control of said information medium.

19. Seat, comprising an apparatus, in particular said apparatus attached to the back of said seat, said apparatus comprising:
   a plate with a flat recess;
   an insert which is removably mountable in said flat recess of said plate and is configured to receive an information medium which is viewable when said insert is mounted in said flat recess of said plate,
   wherein for releasably attaching of said insert on mounting of the same in said flat recess, said insert has the following:
      at least one tongue on a first border area of said insert for engagement in at least one correspondingly shaped groove in said plate, and
      at least one releasable attachment that is present in or on at least one second border area of said insert and that is operable by at least one of twisting and sliding at least one component.

20. Vehicle, comprising a seat, said seat, comprising an apparatus, in particular said apparatus attached to the back of said seat, said apparatus comprising:
   a plate with a flat recess;
   an insert which is removably mountable in said flat recess of said plate and is configured to receive an information medium which is viewable when said insert is mounted in said flat recess of said plate,
   wherein for releasably attaching of said insert on mounting of the same in said flat recess, said insert has the following:
      at least one tongue on a first border area of said insert for engagement in at least one correspondingly shaped groove in said plate, and at least one releasable attachment that is present in or on at least one second border area of said insert and that is operable by at least one of twisting and sliding at least one component.

* * * * *